(12) United States Patent
Lamb et al.

(10) Patent No.: US 6,988,364 B1
(45) Date of Patent: Jan. 24, 2006

(54) THERMAL ACTUATOR

(75) Inventors: Kevin W. Lamb, West Hartford, CT (US); David Piscitelli, Wallingford, CT (US); Kenneth Lionello, III, Waterbury, CT (US)

(73) Assignee: Rostra Precision Controls, Inc., Laurinburg, NC (US)

( * ) Notice: Subject to any disclaimer, the term of this patent is extended or adjusted under 35 U.S.C. 154(b) by 0 days.

(21) Appl. No.: 10/807,842

(22) Filed: Mar. 24, 2004

(51) Int. Cl.
*F01B 1/00* (2006.01)
(52) U.S. Cl. .......................................... 60/508; 60/527
(58) Field of Classification Search ................. 60/508, 60/527
See application file for complete search history.

(56) References Cited

U.S. PATENT DOCUMENTS

| | | | |
|---|---|---|---|
| 2,694,415 A | 11/1954 | Dillon | |
| 2,873,633 A | 2/1959 | May | 73/358 |
| 3,016,747 A | 1/1962 | Vernet | 73/368.3 |
| 3,131,563 A | 5/1964 | Britton | |
| 3,266,235 A * | 8/1966 | Carlson, Jr. | 60/527 |
| 3,987,770 A | 10/1976 | Nomura | 123/117 |
| 4,014,514 A | 3/1977 | Priese et al. | 251/331 |
| 4,036,433 A | 7/1977 | Wagner et al. | 236/100 |
| 4,165,857 A | 8/1979 | Morris et al. | 251/54 |
| 4,285,467 A | 8/1981 | Maltby | 236/86 |
| 4,296,770 A * | 10/1981 | Rice | 137/62 |
| 4,346,558 A | 8/1982 | Bernett | 60/527 |
| 4,804,141 A | 2/1989 | Stahly | 236/100 |
| 5,033,865 A | 7/1991 | Kuze | 374/160 |
| 5,176,317 A | 1/1993 | Park et al. | 236/86 |
| 5,623,990 A * | 4/1997 | Pirkle | 165/298 |
| 5,967,410 A | 10/1999 | Lammers | 236/93 |
| 6,530,391 B1 | 3/2003 | Dulin | 137/62 |
| 2003/0041898 A1 | 3/2003 | Dulin | 137/62 |
| 2003/0172970 A1 | 9/2003 | Dulin | 137/62 |

* cited by examiner

*Primary Examiner*—Hoang Nguyen
(74) *Attorney, Agent, or Firm*—Alix, Yale & Ristas, LLP

(57) ABSTRACT

A specially profiled wax retaining cup and piston guide are crimped together to compress a peripheral portion of a diaphragm wax seal to the extent of extruding the diaphragm material to form both an axial seal and at least one radial seal. The compressed, extruded diaphragm seal provides a wax containment seal capable of withstanding high wax pressures that generate high actuation forces. A wax filled thermal actuator reliably produces an actuating force F sufficient to lift a load in a range of 2500 to 6000 times the mass of the actuator. Performance of the thermal actuator may also be expressed in terms of the internal pressures generated and delivered to the bottom of the actuator piston. The pressure applied to the bottom of the actuator piston in the inventive actuator is in the range of approximately 1700 to 8800 psi (124 to 620 kg/cm$^2$).

9 Claims, 5 Drawing Sheets

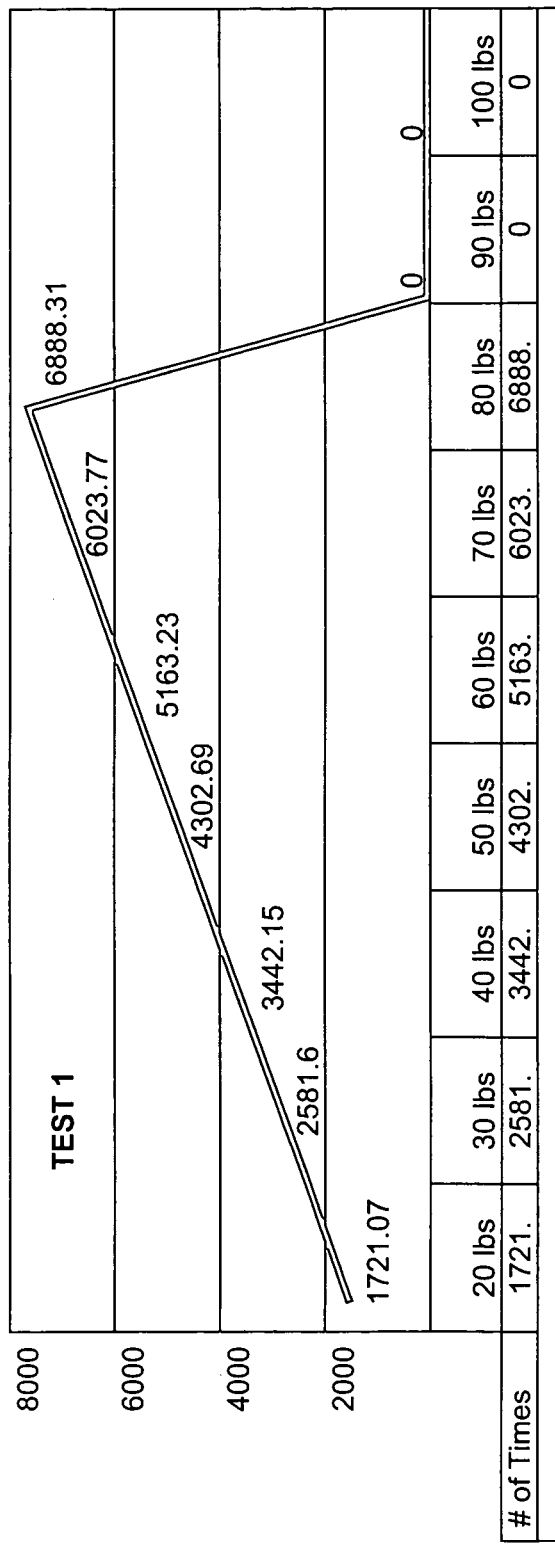
| # of Times | 20 lbs | 30 lbs | 40 lbs | 50 lbs | 60 lbs | 70 lbs | 80 lbs | 90 lbs | 100 lbs |
|---|---|---|---|---|---|---|---|---|---|
|  | 1721. | 2581. | 3442. | 4302. | 5163. | 6023. | 6888. | 0 | 0 |
| LOAD | MOTION @ 180F | MOTION @ 200F | PISTON LENGTH | WAX WEIGHT | OVER ALL PART WEIGHT | PRE-TEST LENGTH | POST TEST LENGTH | # OF TIMES |
|---|---|---|---|---|---|---|---|---|
| 20 lbs | 0.225 | 0.305 | 0.500 | 0.159 | 5.271 | 0.774 | 0.774 | 1721.07 |
| 30 lbs | 0.217 | 0.268 | 0.500 | 0.159 | 5.271 | 0.774 | 0.774 | 2581.6 |
| 40 lbs | 0.212 | 0.241 | 0.500 | 0.159 | 5.271 | 0.774 | 0.774 | 3442.15 |
| 50 lbs | 0.205 | 0.223 | 0.500 | 0.159 | 5.271 | 0.774 | 0.774 | 4302.69 |
| 60 lbs | 0.201 | 0.215 | 0.500 | 0.159 | 5.271 | 0.774 | 0.774 | 5163.23 |
| 70 lbs | 0.187 | 0.196 | 0.500 | 0.159 | 5.271 | 0.774 | 0.774 | 6023.77 |
| 80 lbs | 0.183 | 0.191 | 0.500 | 0.159 | 5.271 | 0.774 | 0.774 | 6888.31 |
| 90 lbs |  |  | 0.500 | 0.159 |  |  |  | 0 |
| 100 lbs |  |  | 0.500 | 0.159 |  |  |  | 0 |
Table 1

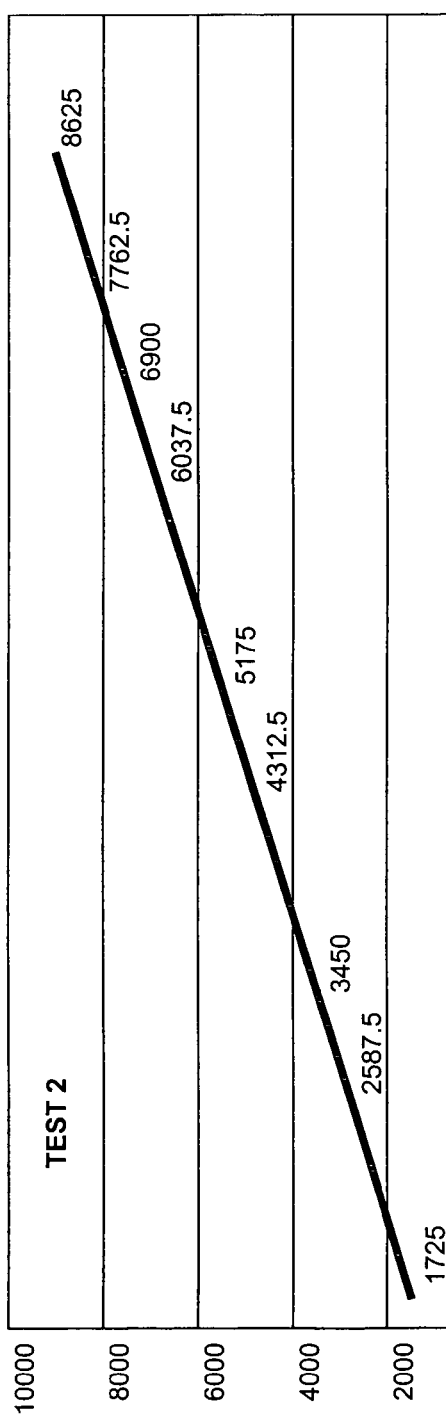
| # of Times | 20 lbs | 30 lbs | 40 lbs | 50 lbs | 60 lbs | 70 lbs | 80 lbs | 90 lbs | 100 lbs |
|---|---|---|---|---|---|---|---|---|---|
| | 1725 | 2587.5 | 3450 | 4312.5 | 5175 | 6037.5 | 6900 | 7762.5 | 8625 |
| LOAD | MOTION @ 145F | MOTION @ 200F | PISTON LENGTH | WAX WEIGHT | OVER ALL PART WEIGHT | PRE-TEST LENGTH | POST TEST LENGTH | # OF TIMES |
|---|---|---|---|---|---|---|---|---|
| 20 lbs | 0.153 | 0.301 | 0.500 | 0.144 | 5.281 | 0.771 | 0.771 | 1725 |
| 30 lbs | 0.144 | 0.205 | 0.500 | 0.144 | 5.281 | 0.771 | 0.771 | 2587.5 |
| 40 lbs | 0.142 | 0.195 | 0.500 | 0.144 | 5.281 | 0.771 | 0.771 | 3450 |
| 50 lbs | 0.136 | 0.141 | 0.500 | 0.144 | 5.281 | 0.771 | 0.771 | 4312.5 |
| 60 lbs | 0.134 | 0.138 | 0.500 | 0.144 | 5.281 | 0.771 | 0.771 | 5175 |
| 70 lbs | 0.127 | 0.131 | 0.500 | 0.144 | 5.281 | 0.771 | 0.771 | 6037.5 |
| 80 lbs | 0.122 | 0.125 | 0.500 | 0.144 | 5.281 | 0.771 | 0.771 | 6900 |
| 90 lbs | 0.117 | 0.119 | 0.500 | 0.144 | 5.281 | 0.771 | 0.771 | 7762.5 |
| 100 lbs | 0.112 | 0.113 | 0.500 | 0.144 | 5.281 | 0.771 | 0.771 | 8625 |
Table 2

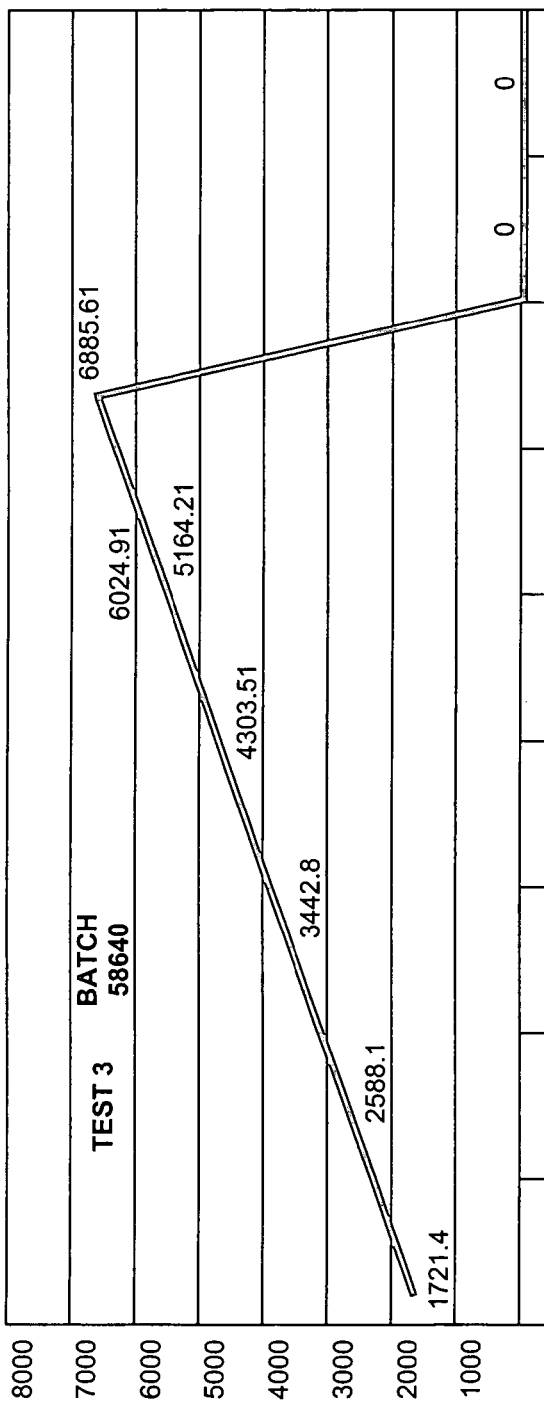
| LOAD | MOTION @ 180F | MOTION @ 200F | PISTON LENGTH | WAX WEIGHT | OVER ALL PART WEIGHT | PRE-TEST LENGTH | POST TEST LENGTH | # OF TIMES |
|---|---|---|---|---|---|---|---|---|
| 20 lbs | 0.243 | 0.362 | 0.610 | 0.141 | 5.270 | 0.770 | 0.770 | 1721.4 |
| 30 lbs | 0.234 | 0.346 | 0.610 | 0.141 | 5.270 | 0.770 | 0.770 | 2588.1 |
| 40 lbs | 0.226 | 0.337 | 0.610 | 0.141 | 5.270 | 0.770 | 0.770 | 3442.8 |
| 50 lbs | 0.223 | 0.326 | 0.610 | 0.141 | 5.270 | 0.770 | 0.770 | 4303.51 |
| 60 lbs | 0.218 | 0.308 | 0.610 | 0.141 | 5.270 | 0.770 | 0.770 | 5164.21 |
| 70 lbs | 0.210 | 0.299 | 0.610 | 0.141 | 5.270 | 0.770 | 0.770 | 6024.91 |
| 80 lbs | 0.201 | 0.000 | 0.610 | 0.141 | 5.270 | 0.770 | 0.770 | 6885.61 |
| 90 lbs | 0.000 | 0.000 | 0.610 | 0.141 | 5.270 | | | 0 |
| 100 lbs | 0.000 | 0.000 | 0.610 | 0.141 | 5.270 | | | 0 |
Table 3

THERMAL ACTUATOR

FIELD OF THE INVENTION

The present invention relates to a thermally actuated control device, particularly of the type wherein a thermally responsive wax actuates a push rod or the like.

DESCRIPTION OF THE RELATED ART

Actuators of this type are often used for thermal control valves, such as described in U.S. Pat. Nos. 2,873,633, 4,036,433 and 5,176,317. Typically, such actuators are designed for a work environment where the temperature variation over the desired operational range is relatively narrow, or the actuating force or displacement is relatively low. For this reason, the seal between the thermally responsive wax and the actuator piston or rod, can be provided by a diaphragm that both seals the wax and transfers the expansion of the wax to the piston. Typically, the diaphragm has a substantially circular base with an outer profile that is shaped to compliment a profile on a guide or other rigid component, whereby sealing can be effectuated between these profiles by crimping or similar mechanical action.

The present inventors have recognized a need to provide a thermal actuator of the thermally responsive wax-type that provides significantly greater actuation force without increasing the size of the actuator.

SUMMARY OF THE INVENTION

Briefly stated, a specially profiled wax retaining cup and piston guide are crimped together to compress a peripheral portion of a diaphragm wax seal to the extent of extruding the diaphragm material to form both an axial seal and at least one radial seal. The compressed, extruded diaphragm seal provides a wax containment seal capable of withstanding the high wax pressures that generate the desired high actuation forces.

The basic structure of a wax filled thermal actuator is a rigid wax-filled cup covered by an actuator guide that supports an actuator piston for axial movement. A wax containment seal is arranged between the wax and the actuator piston. The wax containment seal includes a diaphragm over the wax in the cavity and a generally cylindrical stem or plug protruding into the guide to deliver force from the expanding wax to the bottom of the actuator piston.

A high integrity wax containment seal in embodiments of the present invention is achieved by pre-loading an annulus at the radial extremity of a diaphragm seal between peripheral portions of the cup and guide. In a preferred embodiment, the seal diaphragm is compressed by a profiled bottom surface of the guide flange to effectively create an annular O-ring seal at the periphery of the actuator. The wax seal has the overall appearance of a top hat, with the base forming a diaphragm of substantially uniform thickness. The diaphragm and plug of the wax seal may be formed as separate components of the same or different materials. The periphery of the seal diaphragm is trapped between a first shoulder formed in the wax cup and the profiled bottom surface of the guide. Crimping the guide flange to the cup extrudes the outer portion of the diaphragm between the first shoulder and the bottom surface of the guide to create the O-ring.

A second shoulder in the wax cup provides a hard stop for a rim at the periphery of the guide bottom surface. The hard stop between the guide and the cup resists lateral loads and other non-axial forces, which are transferred from rigid metal to rigid metal. Moreover, the hard stop assures a uniform load of the seal. As a result, an actuator according to the invention can contain significantly higher wax pressures than previously known actuators such as shown in U.S. Pat. No. 4,036,433.

Performance of a thermal actuator according to aspects of the present invention may be expressed in terms of a dramatically improved "power to weight" ratio. The inventive thermal actuator reliably produces an actuating force F sufficient to lift a load of 2500 times the mass of the actuator. In a tested configuration, a thermal actuator according to the invention can lift a load over 6000 times its mass, over a distance of at least about 10 percent of the length of the actuator.

Alternatively, performance of the inventive thermal actuator may be expressed in terms of the internal pressures generated and delivered to the bottom of the actuator piston. The pressure applied to the bottom of the actuator piston in the inventive actuator is in the range of approximately 1700 to 8800 psi (124 to 620 kg/cm$^2$).

The invention is particularly effective in a compact configuration where the mass of the actuator is less than about 8 grams and the lifting force is greater than 80 N.

DETAILED DESCRIPTION OF AN EXEMPLARY EMBODIMENT

Figures 1, 2:
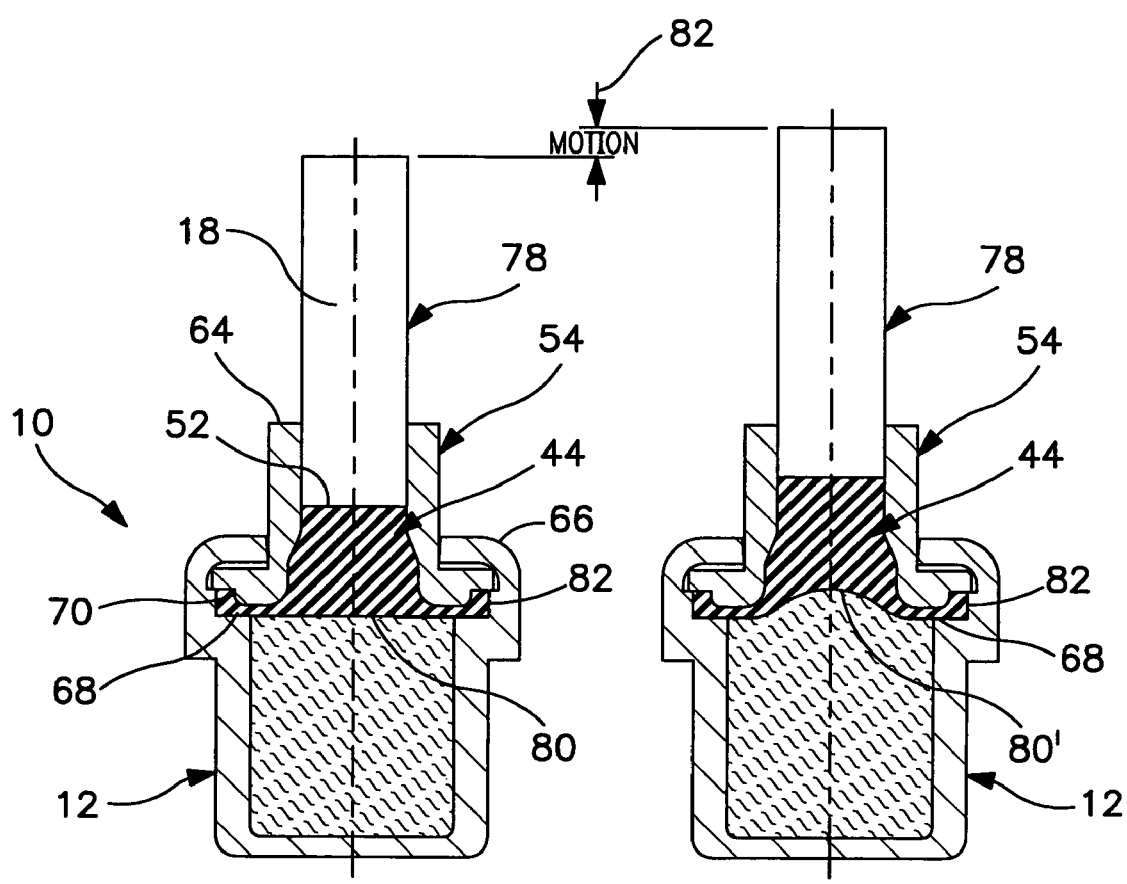
FIGS. 1 and 2 are sectional views of an actuator and associated piston rod in accordance with the preferred embodiment of the invention, showing neutral and actuated conditions, respectively.

An exemplary embodiment of the inventive thermal actuator will be described with reference to the accompanying FIGS. 1–4.

The overall configuration of the thermal actuator 10 resembles a conventional actuator, in that it comprises a rigid cup 12, a resilient diaphragm wax seal, a plug 44, and a guide member 54, for receiving an actuator rod or piston 78. In an exemplary configuration, the plug 44 includes an integrally molded radially extending diaphragm base 46. The rigid cup 12 has an open top portion 14, a closed bottom portion 16 and a centerline 18 passing through the top and bottom portions. The bottom portion defines a cylindrical cavity having a diameter 22, filled with thermally responsive wax 24 to an intermediate level 26 within the cup. The top portion of the cup includes an annular first shoulder 28 having a diameter 30 at the intermediate level 26 of the cavity. A first cylindrical wall 32 extends axially at the first shoulder diameter 30, thereby forming a first notch 34. An annular second shoulder 36 extends radially outward from the first cylindrical wall 32 to a second shoulder diameter 38. In the pre-assembled condition shown in FIG. 3, a tab wall 40 extends axially from the second shoulder diameter, thereby forming a second notch 42. As described in greater detail below, this tab wall 40 will be crimped over, as shown in FIG. 4, to secure a profiled flange of the guide member 54 against the shoulder 36 of notch 42. This arrangement axially compresses a peripheral portion of the diaphragm base 46 of the plug 44 and also provides a rigid, metal-to-metal hard stop between the guide 54 and the cup 12.

The diaphragm base 46 of plug 44 extends transversely over the top of the cavity 20 at the intermediate level 26 of the cup. In the exemplary embodiment, the plug 44 and diaphragm base 46 are molded from nitrile rubber or a similar elastomer as a single component. The peripheral portion of the diaphragm base 46 has a uniform thickness as indicated at 76. A generally cylindrical stem portion having a diameter indicated at 50, less than the cavity diameter 22, extends axially to a point 52 beyond the top portion of the cup. The guide 54 has a lower flange portion 56 including a radially outer annular rim 58 bearing against the second shoulder 36 of the cup. The lower flange portion may also include a radially inner circular ridge 60 bearing against the peripheral portion of the diaphragm base 46 at a radial position corresponding to the cavity diameter 22. The guide 54 includes a tubular portion 62 that surrounds the stem 48 and extends axially to a distal end 64 beyond the stem.

Figure 3:
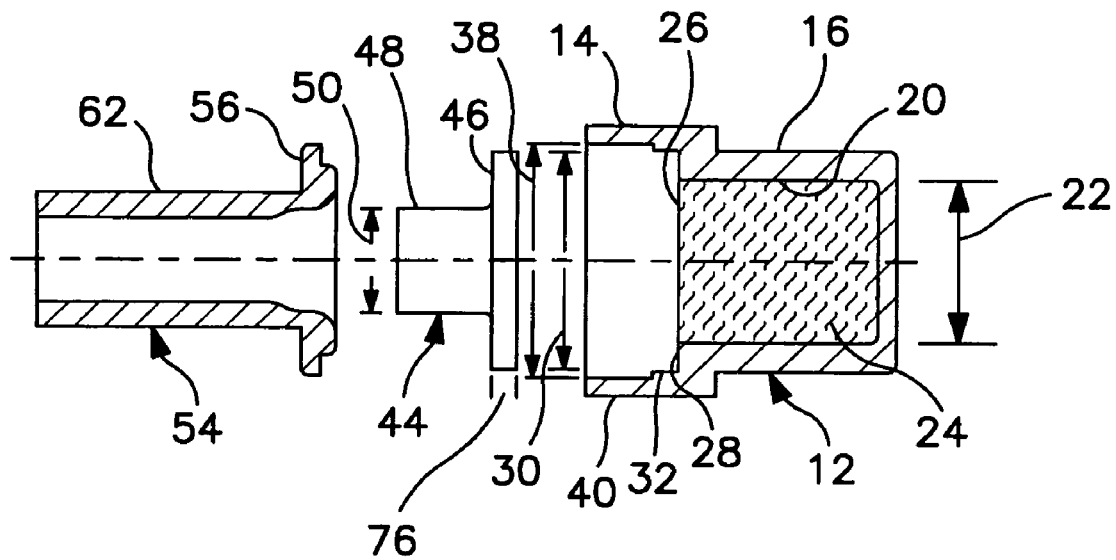
FIG. 3 is an exploded view of the actuator shown in FIGS. 1 and 2.
Figure 4:
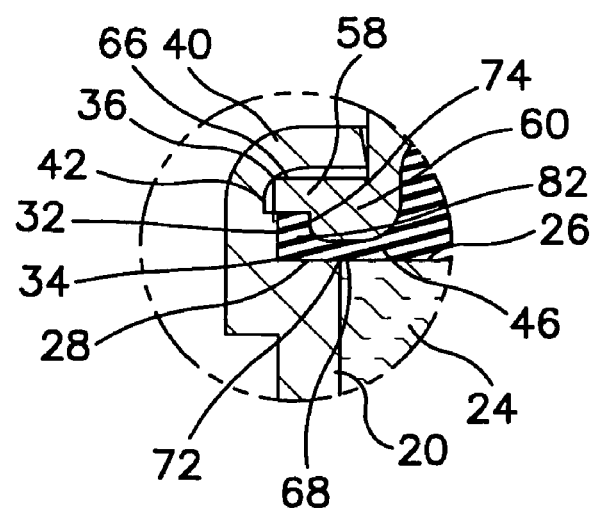
FIG. 4 is an enlarged detail view of the seal area shown at the left in FIGS. 1 and 2; and Tables 1–3 show data from three tests of exemplary thermal actuators under different temperature and load conditions.

The components are axially inter-engaged in the positions shown in FIG. 3 and the tab wall 40 is crimped over into the position shown in FIGS. 1, 2, and 4. This radially inward crimp 66 over the flange portion 56 of the guide captures the rim 58 of the guide in the second notch 42 such that it bears against a hard stop defined by the second shoulder 36 of the cup. During this crimping, the ridge 60 axially compresses the base 46, thereby extruding the peripheral portion of the diaphragm base 46 against the first side wall 32 and filling the space between side wall 32 and the outwardly facing lateral surface 74 of ridge 60. After the tab is crimped, the portion of the diaphragm base 46 that is radially outside the ridge 60 is at least twice the thickness of the portion of the diaphragm base 46 radially inward of the ridge 60. The ridge 60 of the flange thus actuates a first, radially inner seal 68 of the diaphragm base 46 against the first cup shoulder 28, forming an axial seal. Axial compression of the diaphragm base 46 also extrudes the periphery of diaphragm base into the first notch 34 to form a second, radial seal 70 bearing outwardly against the first cylindrical wall 32. The hard stop abutment between the guide 54 and the cup 12 define the extent of axial compression and thus a pre-determined pressure generated on the peripheral portion of the diaphragm base 46.

The extruded outer portion of the diaphragm base 46 effectively forms an O-ring or equivalent 82 that is compressed between hard surfaces of the cup 12 and guide 54. In particular, in the preferred embodiment the ridge 60 has a crown 72 that is centered at the cavity diameter 22, thus providing the greatest axial loading where the wax 24 would first be prone to escape from the wax cavity and initiate leakage. The crown 72 is substantially flat and transverse to the centerline 18. The extruded peripheral portion of the diaphragm base 46, forming the O-ring or equivalent 82, experiences actuating pressure not only from the radial extrusion due to the pressure applied by ridge 60, but also pressure applied by the underside of the rim 58. The expanded O-ring or equivalent experiences a sealing load on four sides, i.e., the underside of the rim 58, the portion of shoulder 28 forming notch 34, the portion of wall 32 forming notch 34, and the radially outer portion 74 of ridge 60 that faces the first cylindrical wall 32.

The dimensions of the shoulders, notches, rims, diameters and profiles are selected such that the crimping at 66 produces the very high loading needed to produce the multiple seals, but the loading is limited by the metal-to-metal hard stop at the shoulder 36 forming notch 42. The extrusion pressure is high enough that the extruded periphery 82 of the diaphragm base fills the notch 34 and bears against the underside of the rim portion of the guide, adjacent the hard stop. However, the compression applied to the diaphragm base 46 is substantially uniform and is predictable for all manufactured units, due to the hard stop. This is unlike conventional designs, where the sealing pressure is applied only against the resilient seal material, without positive feedback during assembly as to when correct (not excessive or insufficient) pressure is loaded on the seals. Upon close inspection of FIG. 4 one can appreciate that any side loading on the actuator would be borne by the metal interaction at notch 42 without significant forces tending to displace or tear the resilient diaphragm base 46.

FIGS. 1 and 2 show the actuator in the nominal condition, such as ambient temperature, and in the actuated condition, such as a higher, limit temperature where the piston or rod 78 has been displaced a distance indicated at 82. This displacement could, for example, be utilized to shift a slide valve from an open to a closed condition to stop flow, or to open a valve to bypass excessively hot fluid, or mix a cooler fluid with an excessively hot fluid. An especially advantageous use would be as the thermal element in a temperature activated valve of the type described in U.S. Pat. No. 6,530,391.

In the nominal condition shown in FIG. 1, the base of the plug 44 is typically flat, perpendicular to centerline 18, and in contact with the flat upper surface of the wax in cup 12. The temperature increase associated with the actuator as shown in FIG. 2, has caused the wax to expand against the bottom of the diaphragm base below the plug 44. However, due to the strong inner seal 68, the periphery of the diaphragm base remains substantially fixed, whereas the central portion below the plug is pushed upwardly within the guide 54, thereby displacing the piston 78. The material of the integral diaphragm base 46 and plug 44 is resilient relative to metal, so that the thinner peripheral portions thereof can be loaded for effectuating a seal against confronting metal surfaces. The thickened central portion corresponding to the plug 44 has sufficient axial rigidity that it can transfer the pressure of the expanded wax axially to the piston 78. The disclosed guide/diaphragm base/cup interface provides a wax containment seal to withstand sustained wax pressures in the range of 124 to 620 kg/cm$^2$ (1700–8800 psi), while resisting lateral loads without seal deterioration.

The inventive thermal actuator reliably produces an actuating force in excess of 2500 times the mass M of the actuator. Testing has shown the inventive thermal actuator capable of producing actuating forces F sufficient to lift in excess of 6000 times the mass M of the actuator. Tables 1–3 show test results establishing the performance of the inventive thermal actuator.

It is well known that thermally responsive wax used in thermal actuators can be formulated to expand at a range of temperatures between 30° to 210° F. Thermal expansion of the wax as a percentage of wax volume between approximately 12 and 20% can also be selected by well known wax formulations. The change in temperature, or ΔT required to activate the wax is typically between 10 and 20° F.

The wax used in the thermal actuators that generated the data for Tables 1 and 3 was formulated to thermally expand approximately 20%. The internal pressures generated by this expansion ruptured the cup, resulting in actuator failure at a load of approximately 90 lbs. The wax used in the thermal actuator that generated the data for Table 2 was formulated to thermally expand by approximately 15%, which moderated the maximum pressure developed within the actuator cup. This version of the thermal actuator generated a force at the piston sufficient to lift a load of approximately 100 lbs, or over 8000 times the mass of the actuator. The mass of the actuators is shown in the column "overall part weight" and is stated in grams. The tested actuators each had a mass slightly less than 5.3 grams. The actuator piston has a diameter of approximately 0.120" (3.05 mm) and a sectional area of approximately 0.0113 in$^2$ (7.306 mm$^2$). The force F at the actuated end of the piston 78 to lift a 20 lb load (1700 times the mass of the actuator) is approximately 89 N (Newtons). The force F at the actuated end of the piston 78 to lift a 70 lb load (6000 times the mass of the actuator) is approximately 312 N.

Alternatively, performance of the inventive thermal actuator may be expressed in terms of the internal pressures generated and delivered to the bottom of the actuator piston by upward displacement of the plug 44. The pressure applied to the bottom of the actuator piston in the inventive actuator is in the range of approximately 1700 to 8800 psi (124 to 620 kg/cm$^2$).

Although exemplary embodiments have been described, it should be appreciated that the scope of exclusive rights is to be determined from the appended claims.

What is claimed is:

1. A thermal actuator comprising:
   a rigid cup having an open top portion, a closed bottom portion, and a centerline passing through the top and bottom portions, wherein
   the bottom portion defines a cylindrical cavity having a cavity diameter and filled with thermally responsive wax to an intermediate level within the cup, and
   the top portion includes an annular first shoulder extending radially outward to a first shoulder diameter at said intermediate level of the cavity, a first cylindrical wall extending axially at said first shoulder diameter, thereby forming a first notch, an annular second shoulder extending radially outward from the first cylindrical wall to a second shoulder diameter, and a tab wall extending from said second shoulder diameter, thereby forming a second notch;
   a plug having
   a diaphragm base extending transversely across and sealing the cavity at said intermediate level and
   a generally cylindrical stem having a diameter less than the cavity diameter and extending axially beyond the top portion of the cup; and
   a guide having
   a lower flange portion including a radially outer annular rim bearing against said second shoulder and a radially inner circular ridge bearing against the base of the plug at said cavity diameter, and
   a tubular portion surrounding and extending axially beyond the stem;
   said tab at the top portion of the cup being crimped radially inwardly over the flange portion of the guide, whereby the rim of the flange is captured in said second notch and bears against a hard stop defined by the second shoulder of the cup, and the ridge of the flange actuates a first, radially inner seal of the base against the cup first shoulder and extrudes the base into said first notch to from a second, radially outer seal against the first cylindrical wall.

2. The actuator of claim 1, wherein the ridge has a crown that is centered at the cavity diameter.

3. The actuator of claim 2, wherein the crown is substantially flat and transverse to the centerline.

4. The actuator of claim 1, wherein the extruded base fills said first notch and bears against the rim portion of the guide, adjacent the hard stop.

5. The actuator of claim 4, wherein the extruded base that fills said first notch is upturned and is loaded with sealing pressure against said first cylindrical wall and a radially outer portion of said ridge that faces said first cylindrical wall.

6. The actuator of claim 1, wherein the diaphragm base of the plug has a uniform nominal thickness before said tab is crimped, and after the tab is crimped the base extrudes such that an annular portion of the diaphragm base radially outside the ridge is at least twice the thickness of the diaphragm base at said radially inner seal.

7. A pre-assembly thermal actuator comprising:
   a rigid cup having an open top portion, a closed bottom portion, and a centerline passing through the top and bottom portions, wherein
   the bottom portion defines a cylindrical cavity having a cavity diameter and filled with thermally responsive wax to an intermediate level within the cup, and
   the top portion includes an annular first shoulder extending radially outward to a first shoulder diameter at said intermediate level of the cavity, a first cylindrical wall extending axially at said first shoulder diameter, an annular second shoulder extending radially outward from the first cylindrical wall to a second shoulder diameter, and a tab wall extending from said second shoulder diameter;
   a plug axially aligned with the cup, said plug having a radially projecting diaphragm base of uniform thickness, and a generally cylindrical stem extending axially from the base;
   a guide axially aligned with the cup, said guide having a lower flange portion including a radially outer annular rim and a radially inner circular ridge, and a tubular portion extending axially from the flange.

8. The actuator of claim 7, wherein the ridge has a crown that is centered at the cavity diameter.

9. The actuator of claim 8, wherein the crown is substantially flat and transverse to the centerline.

* * * * *